Figure 1:
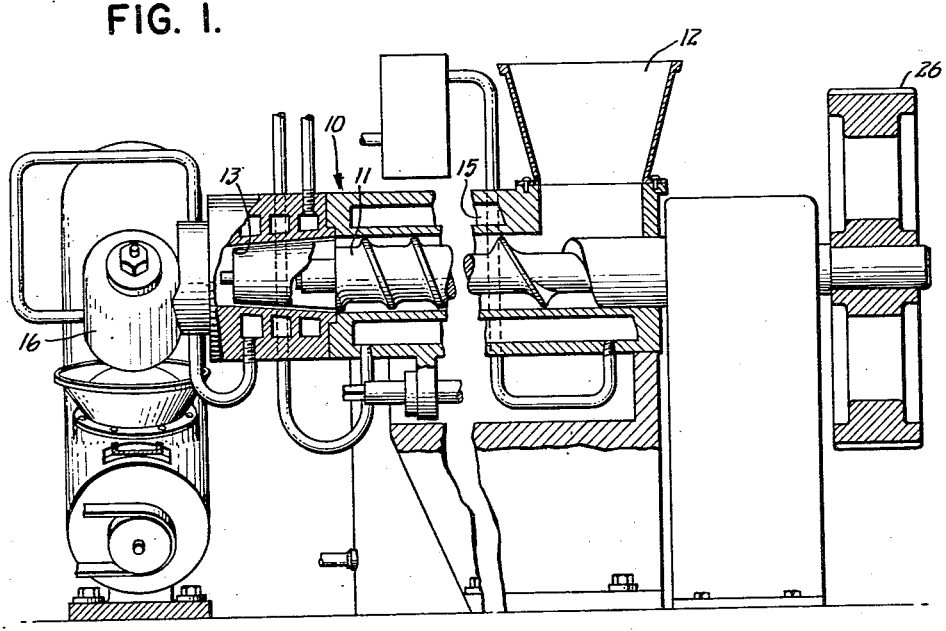

Oct. 16, 1956     B. R. WENDROW     2,767,149
METHOD OF PRODUCTION OF RECLAIMED RUBBER
IN DISCRETE PARTICLE FORM
Filed Dec. 19, 1952

INVENTOR
BENJAMIN R. WENDROW
BY
Curtis Morris & Safford
ATTORNEYS

2,767,149
METHOD OF PRODUCTION OF RECLAIMED RUBBER IN DISCRETE PARTICLE FORM

Benjamin R. Wendrow, Buffalo, N. Y., assignor to U. S. Rubber Reclaiming Co. Inc., Buffalo, N. Y.

Application December 19, 1952, Serial No. 326,933

3 Claims. (Cl. 260—2.3)

This invention relates to the production of reclaimed rubber in discrete-particle form.

In the various methods of reclaiming rubber as heretofore practiced, especially those wherein high temperatures are employed, the reclaim is produced in dense or agglomerate form. I have now demonstrated that, for many uses the reclaimed rubber is most advantageously supplied in small pieces, which may be referred to as "granular," "pelletized," or "crumb" form (which I shall designate generally as "discrete particle form").

With the foregoing and other considerations in view, the present invention contemplates a novel reclaimed rubbed in discrete-particle form, and methods of manufacturing such reclaimed rubber products. In this connection, it is to be noted that the terms "reclaimed rubber" and "reclaim" as used herein are applicable to reclaims from the various types of vulcanized rubbers, whether natural or synthetic, which are capable of being devulcanized, but it is especially advantageous when applied to the output of a reclaiming operation such as that of Joseph Clifton Elgin and Edward F. Sverdrup, disclosed and claimed in their application Serial No. 695,630, filed September 9, 1946 (now abandoned), and in Patents 2,653,348 and 2,653,915 which issued on continuations of said application, and other reclaiming operations wherein the stock is confined under sufficient pressure that gas is occluded in the stock which tends at elevated temperature to generate a disruptive stress therein, counteracting the cohesive nature of the stock.

In accordance with the invention, vulcanized rubber is reclaimed in the presence of heat and while compacted in a confining chamber, advantageously with working during heating, and is then released from the confining chamber and subjected, while hot, to an agitating action, and mixed with a powder or liquid which serves to keep surfaces of the reclaim from coalescing. This is best done against a cool surface and advantageously while loosely held in a cooled chamber or trough. A screw conveyor may be used with advantage for this agitating action.

In accordance with the invention in its more specific aspects, there is applied to the reclaimed material during, and preferably near the beginning of, the agitating stage a substance which is not readily evaporated or absorbed into the pieces of the reclaim (which will be referred to herein as a "parting material"), advantageously a dusting powder. In accordance with the invention in other of its specific aspects, the agitating action is conducted against at least a portion of the weight of the reclaim, as by tipping upwardly a second screw conveyor. The use of a water spray additionally assists in cooling as well as separating the pieces of the reclaim.

Figure 2:
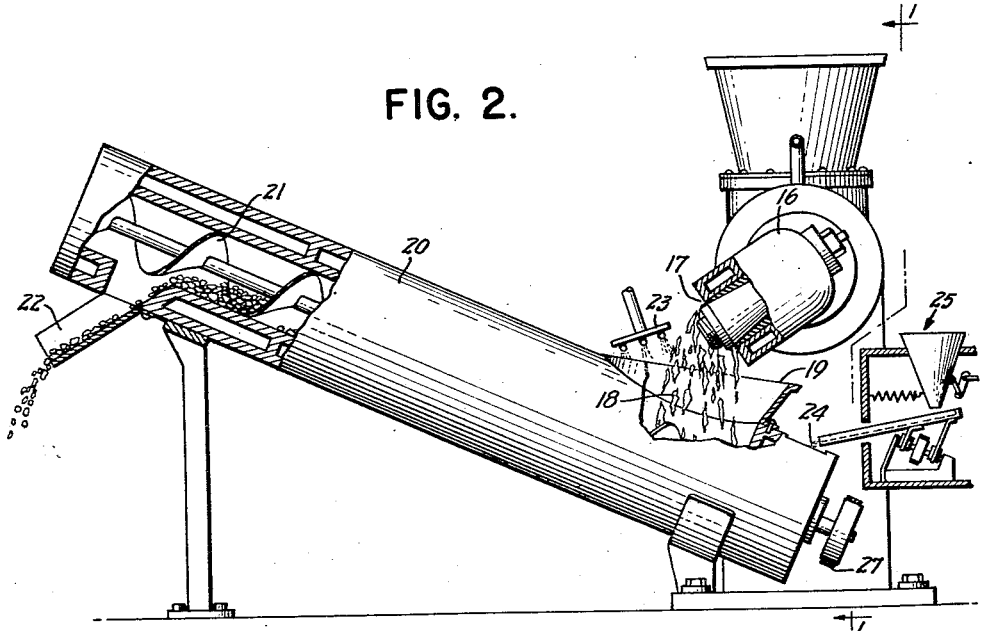

In the accompanying drawings,

Figure 1 is a side view of one form or arrangement whereby the method of the present invention may be carried out and the article thereof produced; and Figure 2 is an end view thereof.

In the form of procedure exemplified by the drawings, vulcanized rubber is passed through an extrusion plasticator 10, for example as set forth in said copending application of Elgin and Sverdrup Serial No. 695,630. The material is discharged (with final heating or cooling if necessary) between 300° and 500° F., and for best results between 350° and 400° F.

Pursuant to the present invention I have shown that such reclaiming by working the stock at vulcanizing temperatures (300° to 500° F. for ordinary applications) leaves the product in a readily friable though tacky condition. This may be attributed to the occlusion of gases in the stock during its heating and/or working under compacting pressure in the confined chamber. In part such gases may be from air occlusion with the comminuted scrap rubber supplied to the reclaiming operation, and in part to gases (fixed gas or vapor) produced in the material during the reclaiming. The tendency of such gases to escape, I believe, pushes apart small pieces of the rubber making it friable in spite of its tackiness and normal tendency to cohere; and at the relatively high temperature specified, this tendency is increased by vaporization and the gas expansion while the strength of cohesion, i. e., the tensile strength, is decreased.

According to this invention this tendency of the reclaim to break apart is utilized by agitating the product so as to aid the internal stresses and assure the actual breaking up of the mass of reclaim; and each break is maintained by providing a fluent insulating material such as dusting powder or non-solvent material (with respect to rubber), which works into the break and coats the tacky surfaces with a thin lubricating layer, thus making them non-adhesive. ("Insulating" is used in its general sense without reference to electrical or thermal properties.) This insulating material is incompatible with the rubber in the sense that it does not spontaneously diffuse or submerge into the rubber and it is also one which does not wholly evaporate from the surfaces of the particles, but should be such that it can be worked into the rubber product when used, e. g., as a compounding ingredient, or innocuous diluent, without seriously impairing its useful properties and, preferably, serving as a useful ingredient, e. g., as pigment, reinforcing agent, softener, anti-oxidant, or vulcanizing agent, etc.

The reclaim produced in accordance with the said prior application Serial No. 695,630 when extruded through the exit orifice 17 in the discharge head is, in the present example, maintained at from 350° to 400° F. and is deposited, as shown at 18, in the inlet portion 19 of chamber 20, which is jacketed and water cooled and upwardly inclined at an angle of about 30°. In this chamber or trough 20 the material is moved against frictional drag and against a portion of its own weight, but without other pressure, by means of a screw conveyor 21 so that it is agitated and tumbled with a mild battering action as the screw drags it up the side of the trough 20 onto the steeper side from which it tumbles back. At the same time it is cooled by the surface 20 along which it is pushed and tumbled. The reclaim is thus conveyed upwardly along the chamber to an outlet 22 from which it is discharged at a temperature below 275° F. in discrete particle form sufficiently free from tackiness so that the particles retain their individuality and do not adhere into large agglomerates. Typical size distributions are given below.

As exemplified, there is applied to the material near the intake portion of the conveyor, both a water spray 23, and a dusting powder 24 from a vibratory feeder 25. When this is done, however, conditions should be controlled to avoid balling up the powder, e. g., this spray should be sufficient only to chill the surfaces of the reclaim without wetting the powder which is not yet adhering to the surfaces of the reclaim.

In the specific example set forth, the reclaim is released into the conveyor at the rate of 1800 pounds per hour and is sprayed with water in the form of a conical spray mist (i. e., one or more cones of mist from one or more spray nozzles). In this example whiting, a powder commonly used in the rubber industry for dusting tacky surfaces to insulate them against sticking to contacting surfaces, is supplied to the conveyor at 24 and mixed with the reclaim. The amount of whiting in this particular case was 13% by weight of the reclaim. More or less of the insulating agent down to about 3% can be used, depending upon the nature of the reclaim and especially on its tackiness. The water spray reduces the amount of the dusting powder required.

In general, it is most advantageous for the reclaim as a commercial product to have particle sizes in the range 15–40% capable of passing a 5 mesh screen but retained by 8 mesh; 18–43% passes 8 mesh but is retained on 12 mesh; 20–30% passes 12 mesh but is retained on 20 mesh; 10–30% passes 20 mesh and is held on 40 mesh; and 2–15% is finer than 40 mesh. This is controlled by the temperature of the reclaim as released from the plasticator extrusion orifice 17, the temperature of the cooling walls of the conveyor 20, the diameter of the screw conveyor, its speed of operation and the insulating quality of the insulating material.

Using, for example, a discharge temperature from orifice 17 of 350°–400° F. and a wall temperature of about 150° F. in the screw conveyor (a coolant temperature in the jacket at the feed end about 70° F.); with a screw of 16 inches outside diameter in the conveyor shown, rotating at 50 R. P. M. and peripheral speed of 210 feet per minutes, and a fine water spray supplied as shown at a rate of about 0.4 gallon per minute, results were as shown below with various powders:

|  | With whiting of less than 10 micron average particle size | With "Nuchar" or other suitable wood carbon of less than 0.5 micron average particle size |
| --- | --- | --- |
|  | Percent | Percent |
| Pass 5 held on 8 mesh | 30.2 | 27.6 |
| Pass 8 held on 12 mesh | 34.0 | 31.4 |
| Pass 12 held on 20 mesh | 23.0 | 25.2 |
| Pass 20 held on 40 mesh | 9.6 | 12.9 |
| Pass 40 held on pan | 3.2 | 2.9 |

The whiting used was of the grade commonly supplied for dusting rubber.

With the same reclaim and operating conditions but a laboratory scale plasticator and conveyor (6 inch diameter conveyor screw operating at 130 R. P. M.) a typical screen analysis was:

|  | With whiting of less than 10 micron average particle size |
| --- | --- |
|  | Percent |
| Pass 5 mesh held on 8 mesh | 18.6 |
| Pass 8 mesh held on 12 mesh | 19.5 |
| Pass 12 mesh held on 20 mesh | 22.4 |
| Pass 20 mesh held on 40 mesh | 26.0 |
| Pass 40 mesh held on pan | 13.5 |

The better the rubber-particle-from-rubber-particle isolating or "parting" quality of the insulating ("incompatible") material used, the finer will be the particles of reclaim produced.

As will be appreciated, the plasticator screw and the pelletizing conveyor screw may be arranged and driven independently or integrally, being, in the present instance, angularly arranged and independently driven by driving means 26 and 27, respectively.

It will be appreciated that the use of a dusting powder and/or a liquid spray, and the agitation of the material and the cooling thereof either by special means or by conveying it in loose form without the application of heat, each of themselves has a definite effectiveness in the production of reclaimed rubber in discrete-particle form; and that these features in combination produce such a product with particular efficiency and effectiveness. If the powder is used without a vaporizable inert liquid, the conveyor chamber may be sealed to the extrusion outlet and filled with an inert gas such as cold flue gases, carbon dioxide or nitrogen to prevent burning when the reclaim is discharged at higher temperatures and a stream of such gas at low temperatures may serve to cool the reclaim. If the surfaces of the reclaim are sufficiently chilled, the insulating agent may be omitted, but that is not recommended if the product is to be stored or shipped.

While there are given above certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

I claim:

1. A process of subdividing reclaimed rubber as it comes from a reclaiming apparatus which delivers the rubber by extruding it through a narrow orifice at a temperature of from 300° F. to 500° F., adding to the hot reclaim in the relatively massive form in which it comes from the reclaiming step a particle-separating powder, immediately tumbling the material without compaction or mastication of the mass of material, whereby the tumbling will break up the material into fine particles and apply the particle-separating powder onto the surfaces formed in the breaks, and cooling during the course of the tumbling.

2. A process as in claim 1 wherein the material is moved forward against the force of gravity during the tumbling.

3. A process as in claim 1 wherein water is sprayed on the material as it comes from the reclaiming step.

References Cited in the file of this patent

UNITED STATES PATENTS

| 866,759 | Wheeler | Sept. 24, 1907 |
| 2,164,400 | Groskopf | July 4, 1939 |
| 2,278,826 | Castello et al. | Apr. 7, 1942 |
| 2,286,405 | Gordon | June 16, 1942 |
| 2,408,296 | Cotton et al. | Sept. 24, 1946 |
| 2,459,745 | Waters | Jan. 18, 1949 |
| 2,461,193 | Banbury et al. | Feb. 8, 1949 |
| 2,469,529 | Tewksbury et al. | May 10, 1949 |
| 2,487,666 | Navone | Nov. 8, 1949 |
| 2,653,348 | Elgin et al. | Sept. 29, 1953 |
| 2,665,568 | Meyer et al. | Jan. 12, 1954 |

FOREIGN PATENTS

| 460,004 | Canada | Sept. 27, 1949 |